L. J. MEWBORN.
Potato-Cutters and Planters.
No. 143,707. Patented Oct. 14, 1873.
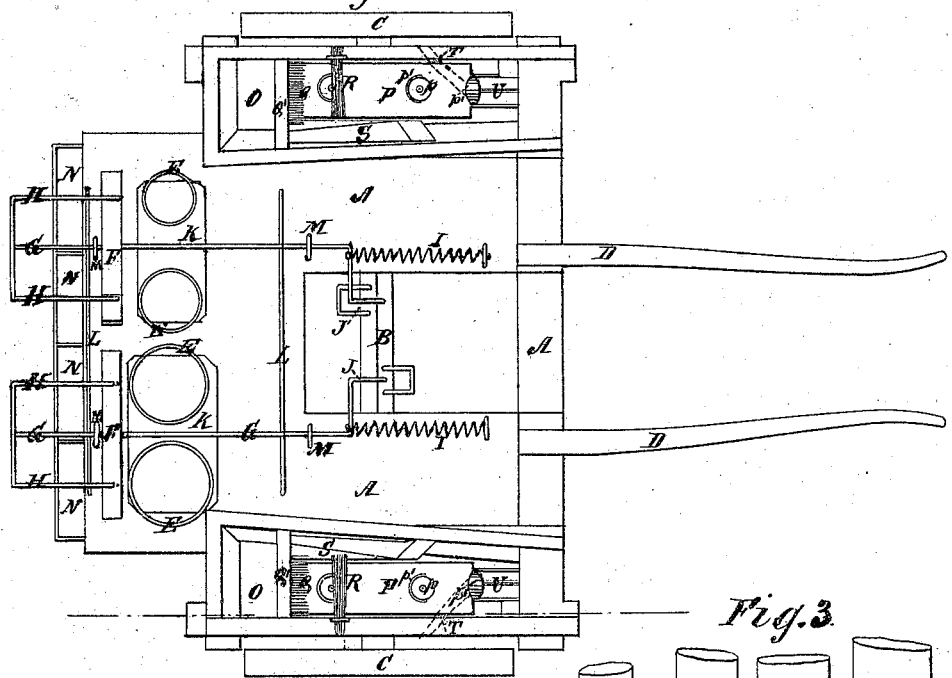
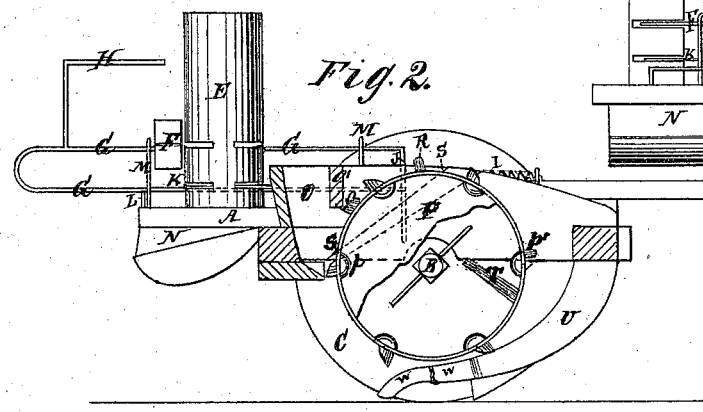
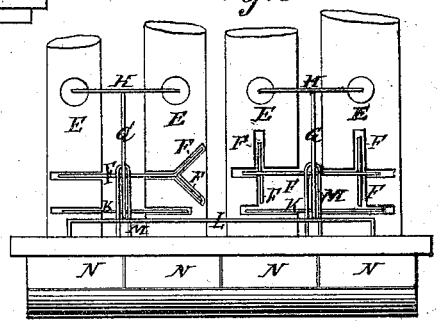
Witnesses:
G. Matthys
Solon C. Kemon
Inventor:
Lemuel J. Mewborn
Per Kemon & E
Attorneys.

UNITED STATES PATENT OFFICE.

LEMUEL J. MEWBORN, OF KINSTON, NORTH CAROLINA.

IMPROVEMENT IN POTATO CUTTERS AND PLANTERS.

Specification forming part of Letters Patent No. 143,707, dated October 14, 1873; application filed July 9, 1873.

*To all whom it may concern:*

Be it known that I, LEMUEL J. MEWBORN, of Kinston, in the county of Lenoir and State of North Carolina, have invented a new and Improved Potato Cutter and Planter; and I do hereby declare the following to be a full, clear, and exact description of the same, reference being had to the accompanying drawing forming part of this specification, in which—

Figure 1 is a top view. Fig. 2 is a vertical longitudinal section. Fig. 3 is a rear view of a series of cylinders and cutters.

The invention relates to modes of cutting potatoes and dropping them into the furrow otherwise than by hand; and consists in the means hereinafter described and pointed out in the claims.

In the drawing, A is the frame, B the rotary axle, C C the wheels, and D D the shafts, of a potato cutting and planting vehicle. E is a series of vertical tubes of any configuration, but preferably cylindrical. They are each of a different diameter, depending upon the size of the seed-tubers, and provided with reciprocating cutters F. The first that operates in the smallest cylinder divides the potato into two pieces, the second into three, and the others into four pieces. These knives slide through suitable slots in the cylinders, and are arranged on rods G, which are connected with parallel fingers H H, that hold the potato which is next to be cut. They also have at the front end a spring, I, which throws them back, and downward projections J that are caught by loops or lugs on the rotary axle, and thus enabled to operate the knives. On a subjacent rod, and in advance of the knife, is placed a rest or plate, K, which moves out as the knife moves in, and vice versa. L L are transverse rods on which the rods G slide, and M M are guide-loops in which they move.

The potatoes may be sorted into grades of uniform size, and either placed in hoppers above, so as to be fed by gravity, or fed in any other suitable manner to the cylinders.

N are receptacles connected with and placed below the cylinders to receive the cut potatoes, which may be then transferred to the hoppers O. P is a rotary disk, having the pockets $p$, with an upward flange, $p'$, on the rear side thereof. Q is a brush on the cross-bar Q', and R another brush projecting over hopper and sweeping any pieces of potatoes, except that in the pocket, into the rearwardly-inclined channel S which leads back to the hopper. T is another brush placed on the inside of disk and adapted to pass through a hole of pocket and insure the fall of the potato into the right position and part of the furrow. U is a furrow-opener, through whose wings $w$ $w$ passes the cut tuber into the furrow.

The cylinders E may be placed above the hoppers O, so as to drop the cut potatoes directly thereinto, while the whole potatoes may be fed from a superposed hopper, thus causing the feed, cutting, and the planting to be performed automatically and in succession, the whole operation being performed on the vehicle and by the horse-power. Beside the advantage of economy in the cutter, the uniformity in the size of the pieces over those cut by hand enables the former to be dropped with much greater facility.

Having thus described my invention, what I claim as new, and desire to secure by Letters Patent, is—

1. The upward flanges $p'$ on the rear side of seed-pockets $p$, and above the periphery of dropping-disk, as and for the purpose specified.

2. The inclined side channel S, leading back to the front of hopper, combined with a brush, R, as and for the purpose described.

3. The tube E, plate K, cutter F, and fingers H, constructed and arranged to operate substantially in the manner described.

The above specification of my invention signed by me this 28th day of June, 1873.

L. J. MEWBORN.

Witnesses:
SOLON C. KEMON,
CHAS. A. PETTIT.